(12) United States Patent
Shimomura et al.

(10) Patent No.: US 11,758,054 B2
(45) Date of Patent: *Sep. 12, 2023

(54) MULTIPLE DWELLING HOUSE INTERPHONE SYSTEM

(71) Applicant: Aiphone Co., Ltd., Nagoya (JP)

(72) Inventors: Yuta Shimomura, Nagoya (JP);
Masashi Hattori, Nagoya (JP);
Kimiaki Fujishima, Nagoya (JP);
Ryoji Uno, Nagoya (JP)

(73) Assignee: AiPhone Co., Ltd, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,733

(22) Filed: Feb. 28, 2022

(65) Prior Publication Data

US 2022/0286562 A1  Sep. 8, 2022

(30) Foreign Application Priority Data

Mar. 2, 2021  (JP) ................................. 2021-032837

(51) Int. Cl.
   *H04M 11/02*   (2006.01)
(52) U.S. Cl.
   CPC ................................. *H04M 11/025* (2013.01)
(58) Field of Classification Search
   CPC ................................................. H04M 11/025
   USPC ..................................................... 379/102.06
   See application file for complete search history.

(56) References Cited

U.S. PATENT DOCUMENTS

| | | | | |
|---|---|---|---|---|
| 7,783,018 | B1* | 8/2010 | Goldberg | H04M 11/025 709/204 |
| 7,899,437 | B2* | 3/2011 | Baum | H04M 1/72424 455/404.1 |
| 8,041,016 | B2* | 10/2011 | Trell | H04M 11/025 455/420 |

(Continued)

FOREIGN PATENT DOCUMENTS

| | | |
|---|---|---|
| JP | 2005-159883 A | 6/2005 |
| JP | 2007-067727 A | 3/2007 |
| JP | 2010-028771 A | 2/2010 |

OTHER PUBLICATIONS

Extended European Search Report dated Jul. 14, 2022 (Application No. 22159227.2).

*Primary Examiner* — Maria El-Zoobi
(74) *Attorney, Agent, or Firm* — BURR PATENT LAW, PLLC

(57) ABSTRACT

A multiple dwelling house interphone system includes a collective entrance machine and dwelling room master devices. When a calling operation section is operated and a dwelling unit number of a calling destination is input, a master device speech control section of the dwelling room master device of the dwelling unit including a plurality of dwelling room master devices performs a calling control of transmitting a call signal to the dwelling room master device of the calling destination having its master device ID, and subsequently forming a speech path when a response operation of the dwelling room master device of the calling destination is performed. The calling and speaking to the other dwelling unit are allowed even in a state where another dwelling room master device of the dwelling unit itself has formed a speech path with the dwelling room master device of the other dwelling unit.

2 Claims, 4 Drawing Sheets

(56) References Cited

U.S. PATENT DOCUMENTS

| | | | | |
|---|---|---|---|---|
| 8,189,753 | B1* | 5/2012 | Soucy, III | H04M 11/025 |
| | | | | 379/159 |
| 9,542,832 | B1* | 1/2017 | Fu | G08B 25/008 |
| 9,635,322 | B2* | 4/2017 | Yamamoto | H04M 9/08 |
| 10,931,831 | B2* | 2/2021 | He | H04M 1/0291 |
| 10,944,940 | B1* | 3/2021 | Tanaka | H04M 3/436 |
| 2004/0243812 | A1* | 12/2004 | Yui | G07C 9/00563 |
| | | | | 713/182 |
| 2006/0007005 | A1* | 1/2006 | Yui | G07C 9/00309 |
| | | | | 340/5.1 |
| 2017/0214802 | A1* | 7/2017 | Gaspard | H04M 7/1295 |
| 2022/0311869 | A1* | 9/2022 | Shimomura | G07C 9/32 |

* cited by examiner

FIG.3

| DWELLING UNIT NUMBER | TERMINAL NUMBER | IP ADDRESS | | | |
|---|---|---|---|---|---|
| 101 | 001 | 192 | 168 | 1 | 1 |
| | 002 | 192 | 168 | 1 | 2 |
| 102 | 003 | 192 | 168 | 1 | 3 |
| 103 | 004 | 192 | 168 | 1 | 4 |
| | 005 | 192 | 168 | 1 | 5 |
| 104 | 006 | 192 | 168 | 1 | 6 |
| | 007 | 192 | 168 | 1 | 7 |
| 105 | 008 | 192 | 168 | 1 | 8 |
| | 009 | 192 | 168 | 1 | 9 |
| 201 | 010 | 192 | 168 | 1 | 10 |
| | 011 | 192 | 168 | 1 | 11 |
| 202 | 012 | 192 | 168 | 1 | 12 |
| 203 | 013 | 192 | 168 | 1 | 13 |
| | 014 | 192 | 168 | 1 | 14 |
| 204 | 015 | 192 | 168 | 1 | 15 |
| | 016 | 192 | 168 | 1 | 16 |
| ⋮ | | | | | |

FIG.4

| DWELLING UNIT NUMBER | TERMINAL NUMBER | 101 | | 102 | 103 | | 104 | | 105 | | 201 | 202 | | 203 | | 204 | | ... |
|---|---|---|---|---|---|---|---|---|---|---|---|---|---|---|---|---|---|---|
| | | 001 | 002 | 003 | 004 | 005 | 001 | 002 | 004 | 005 | 003 | 004 | 005 | 001 | 002 | 004 | 005 | ... |
| 101 | 001 | — | | | | | | | | | | | | | | | | |
| | 002 | | | | permitted | | | | | | | | | | | | | |
| 102 | 003 | permitted | | — | | | | | | | | | | | | | | |
| 103 | 004 | permitted | | | — | | | | | | | | | | | | | |
| | 005 | | | | | | | — | | | | | | | | | | |
| 104 | 006 | | | | | | | | | | | | | | | | | |
| | 007 | | | | | | | | — | | | | | | | | | |
| 105 | 008 | | | | | | | | | | — | | | | | | | |
| | 009 | | | | | | | | | | | | | permitted | | | | |
| 201 | 010 | | | permitted | | | | | | | | | | | | | | |
| 202 | 011 | | | | | | | | permitted | | | | | | | | | |
| | 012 | | | | | | | | | | | — | | | | | | |
| 203 | 013 | | | | | | | | | | | | | | | — | | |
| | 014 | | | | | | | | | | | | | permitted | | | | |
| 204 | 015 | | | | | | | | | | | | | | | | | |
| | 016 | | | | | | | | | | | | | | | | — | |
| ... | | | | | | | | | | | | | | | | | | |

MULTIPLE DWELLING HOUSE INTERPHONE SYSTEM

BACKGROUND OF INVENTION

Technical Field

The disclosure relates to a multiple dwelling house interphone system, especially relates to a multiple dwelling house interphone system that enables speaking between dwelling units.

Background Art

In a multiple dwelling house, a door installed at an entrance is usually locked to ensure security, and a visitor can enter a dwelling area by asking a dweller to unlock the door. Therefore, a collective entrance machine with which the visitor calls the dweller is installed at the entrance, and a dwelling room master device to respond to the call is installed at each dwelling unit.

While the conventional multiple dwelling house interphone system including the collective entrance machine and a plurality of dwelling room master devices does not enable the speaking between the dwelling units using the dwelling room master devices, there has been proposed one that enables the speaking between the dwelling room master devices as described in JP 2010-288771 A, for example.

The above-described conventional multiple dwelling house interphone system that enables the speaking between the dwelling room master devices is a technique that assumes a case where one dwelling room master device is installed for each dwelling unit, and a case where a plurality of dwelling room master devices are installed for each dwelling unit is not assumed.

However, recently, the multiple dwelling house interphone system in which a plurality of dwelling room master devices are installed for each dwelling unit has become popular. In this case, it becomes possible for the plurality of dwelling room master devices to simultaneously form speech paths with the dwelling room master devices of other dwelling units. Actually, it is desired to provide a function that enables calling to a dwelling room master device of another dwelling unit from a dwelling room master device not in use and speaking with the dweller while one dwelling room master device is busy with the other dwelling unit.

Therefore, it is an object of the disclosure to provide a multiple dwelling house interphone system in which a plurality of dwelling room master devices are installed in one dwelling unit, and even when one dwelling room master device is already used for speaking with a dweller in another dwelling unit, calling to the other dwelling unit from a dwelling room master device not in use and speaking with the dweller are allowed.

SUMMARY OF THE INVENTION

In order to solve the above-described matter, there is provided a multiple dwelling house interphone system according to a first aspect of the disclosure. The multiple dwelling house interphone system includes a collective entrance machine and dwelling room master devices. The collective entrance machine is installed at an entrance of a multiple dwelling house and used for calling and speaking with a dweller by a visitor. The dwelling room master devices are installed in individual dwelling units and used for responding to the calling from the collective entrance machine. A plurality of the dwelling room master devices are installed at least in one of the individual dwelling units. The dwelling room master devices each include an ID information storage section, a calling operation section, and a master device speech control section. The ID information storage section stores a master device ID for identifying the dwelling room master device itself and master device IDs of the dwelling room master devices of other dwelling units. The calling operation section performs an operation of calling to the other dwelling unit. The master device speech control section controls a calling and speaking to the dwelling room master device of the other dwelling unit. Master device ID information stored in the ID information storage section is associated with a dwelling unit number. When the calling operation section is operated and the dwelling unit number of a calling destination is input, the master device speech control section of the dwelling room master device of the dwelling unit having the plurality of dwelling room master devices performs a calling control. Then, the calling control obtains information on the master device ID associated with the dwelling unit number of the calling destination from the ID information storage section, transmits a call signal to the dwelling room master device having the master device ID, and subsequently forms a speech path when a response operation of the dwelling room master device of the calling destination is performed. The calling and speaking to the other dwelling unit are allowed even in a state where another dwelling room master device of the dwelling unit itself has formed a speech path with the dwelling room master device of the other dwelling unit.

With this configuration, even in a state where the plurality of the dwelling room master devices are installed in one dwelling unit, and one dwelling room master device is busy with the dwelling room master device of the other dwelling unit, the speech path can be formed with the other dwelling unit using the other dwelling room master device. Accordingly, the plurality of dwelling room master devices can be effectively used without the limitation of the number of speech path formation. Additionally, since the dwelling room master devices each perform the control of forming the speech path with the dwelling room master device of the other dwelling unit, the need for installing a controller to control the communication between the devices like the conventional one can be eliminated.

In a second aspect of the disclosure, which is in the configuration according to the first aspect, the dwelling room master device includes a permitted dwelling unit storage section that stores the dwelling unit to which the calling and speaking are permitted. Even when the calling operation section is operated to receive an input of the dwelling unit number of the calling destination, the master device speech control section does not transmit the call signal without the permission.

With this configuration, since the dwelling unit allowed for the calling and speaking can be set, the calling and speaking are restricted while the calling to any other dwelling unit and speaking with the dweller are capable with the setting. Accordingly, the calling from a suspicious dweller or an annoying dweller can be avoided. All the calling from the other dwelling units can be also inhibited. As a result, the function setting corresponding to the desire and safely using the function are allowed.

According to the disclosure, even in a state where the plurality of the dwelling room master devices are installed in one dwelling unit, and one dwelling room master device is busy with the dwelling room master device of the other dwelling unit, the speech path can be formed with the other dwelling unit using the other dwelling room master device. Accordingly, the plurality of dwelling room master devices can be effectively used without the limitation of the number of speech path formation. Additionally, since the dwelling room master devices each perform the control of forming the speech path with the dwelling room master device of the other dwelling unit, the need for installing a controller to control the communication between the devices like the conventional one can be eliminated.

BRIEF DESCRIPTION OF THE DRAWINGS

FIG. 3 is an explanatory diagram of a master device ID stored in an ID information storage section.

FIG. 4 is a table illustrating storage contents of a permitted dwelling unit storage section.

DETAILED DESCRIPTION

Figure 1:
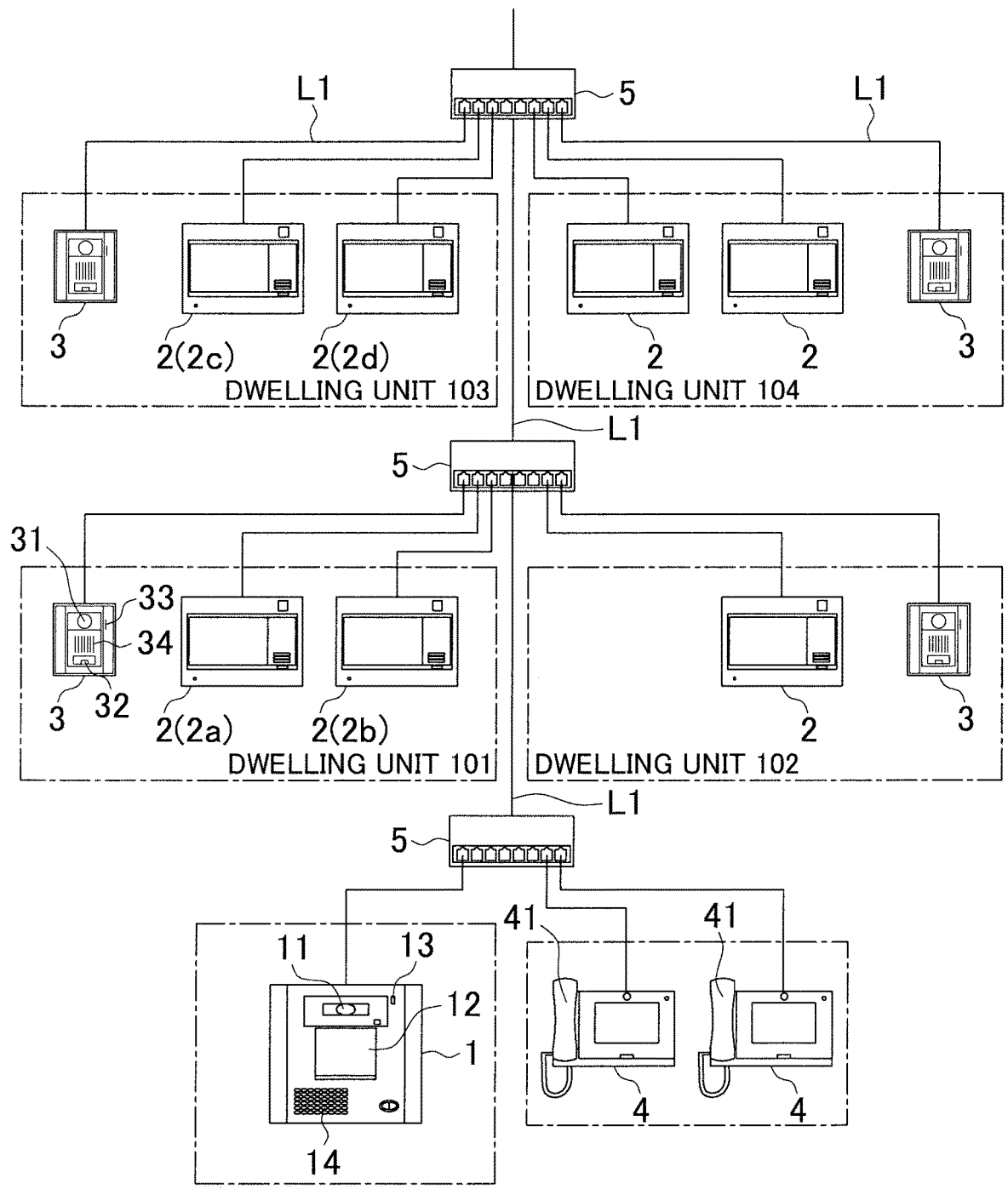
FIG. 1 is a block diagram illustrating an exemplary multiple dwelling house interphone system according to the disclosure.

The following describes embodiments in detail with reference to the drawings. FIG. 1 is a block diagram illustrating an exemplary multiple dwelling house interphone system according to the disclosure. The multiple dwelling house interphone system includes a collective entrance machine 1, dwelling room master devices 2, entrance slave devices 3, and management room master devices 4. The collective entrance machine 1 is installed at an entrance of a multiple dwelling house and used for calling a dweller by a visitor. The dwelling room master devices 2 are installed in individual dwelling units and used for responding to the calling from the collective entrance machine 1. The entrance slave devices 3 are installed at entrances of the dwelling units and used for calling the dwellers. The management room master devices 4 are installed in a manager room and used for speaking with the dwellers and the like.

At least one dwelling room master device 2 is installed for each dwelling unit, and a configuration in which two dwelling room master devices 2 are installed excluding a part of dwelling units is illustrated here.

Reference character 5 denotes a HUB, the devices are mutually connected by a LAN via communication lines L1, and the communication between the devices is performed by an Internet Protocol (IP).

The collective entrance machine 1 includes a camera 11, an operation section 12, a microphone 13 and a speaker 14, and the like. The camera 11 obtains an image of a visitor. The operation section 12 includes a touch panel to select the dwelling unit. The microphone 13 and the speaker 14 are used for speaking.

Figure 2:
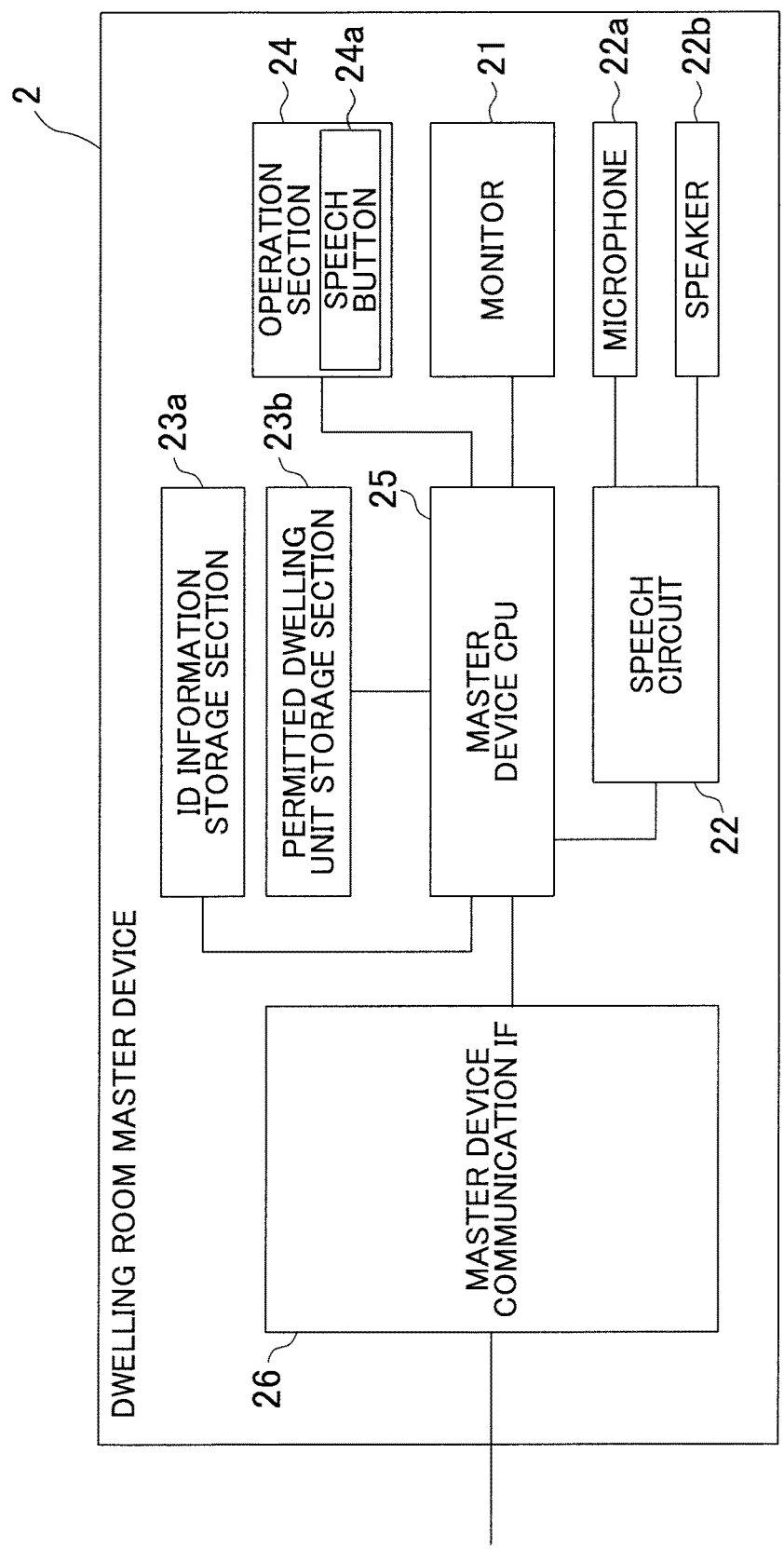
FIG. 2 is a block diagram of a dwelling room master device.

FIG. 2 is a function block diagram of the dwelling room master device 2. As illustrated in FIG. 2, the dwelling room master device 2 includes a monitor 21, a speech circuit 22, an ID information storage section 23a, a permitted dwelling unit storage section 23b, an operation section 24, a master device CPU 25, a master device communication IF 26, and the like. The monitor 21 displays various kinds of information and displays a video of the visitor. The speech circuit 22 includes a microphone 22a and a speaker 22b. The ID information storage section 23a stores IDs of the individual dwelling room master devices 2 in the multiple dwelling house. The permitted dwelling unit storage section 23b stores the dwelling unit allowed for calling and speaking.

The operation section 24 performs various operations. The master device CPU 25 controls the dwelling room master device 2. The master device communication IF 26 communicates with the devices via the LAN.

The operation section 24 includes a speech button 24a for a response operation, and additionally, a calling operation section that includes a touch panel integrated with the monitor 21 and calls the other dwelling unit by an input of a dwelling unit number.

The entrance slave device 3 includes a camera 31 for obtaining an image of a visitor, a call button 32, a microphone 33, a speaker 34, and the like.

The management room master device 4 has a configuration similar to that of the dwelling room master device 2 except that a speech section includes a handset 41.

FIG. 3 is an explanatory diagram of a master device ID stored in the ID information storage section 23a of the dwelling room master device 2 and illustrates a part of a list of the master device ID to be stored. Two dwelling room master devices 2 are installed in most dwelling units excluding a part of the dwelling units. The master device ID is assigned to every dwelling room master device 2. As illustrated in FIG. 3, the master device ID includes a terminal number and an IP address, and different IDs are assigned to the dwelling room master devices 2 of all the dwelling units. The master device IDs are associated with the dwelling unit numbers and stored in the ID information storage section 23a for each dwelling unit.

Operations of the multiple dwelling house interphone system configured as described above are as follows. However, it should be noted that the following operations and the like are similar to those in the conventional system, and therefore, their explanations are omitted. One operation is that the operation section 12 of the collective entrance machine 1 is operated to make a call to a dweller and the dwelling room master device 2 of the dwelling unit as the visit destination emits a call sound. Another operation is that a response operation of the dwelling room master device 2 is performed in response to the call and a speech path is formed. Another operation is that a video image taken by the camera 11 is transmitted together with a call signal and displayed on the monitor 21 of the dwelling room master device 2. The other operation is that an entrance door (not illustrated) is unlocked by operating the dwelling room master device 2.

The following mainly describes an operation of calling the other dwelling unit by the dwelling room master device 2 to form a speech path. As an example, a procedure of calling a dwelling unit 103 from a dwelling unit 101 and forming a speech path is described. The dwelling unit 103 includes the two dwelling room master devices 2 and is set to be allowed for calling as described later. The dwelling unit 101 similarly includes the two dwelling room master devices 2.

First, assume that all of the dwelling room master devices 2 of the dwelling unit 101 and the dwelling unit 103 are in standby states. In this state, the procedure of calling the dwelling unit 103 from the dwelling room master device 2 (hereinafter referred to as a "first master device" 2a) having a terminal number 001 in the dwelling unit 101 is as follows.

The first master device 2a is transitioned to an external speech mode of calling the other dwelling unit by a predetermined operation of the operation section 24, and the dwelling unit number 103 is input. When receiving the input, the master device CPU 25 reads master device ID information of a call signal transmission destination from the ID information storage section 23a based on the dwelling unit number "103" of the calling destination and detects that the two dwelling room master devices 2 having the terminal numbers 004, 005 are the calling destinations.

Then, the master device CPU 25 reads the IP addresses of the terminal numbers and transmits the call signal attached with the ID (master device ID) of itself to the dwelling room master devices 2 having the read IP addresses. Thus, the call signal is transmitted to the two dwelling room master devices 2 having the terminal numbers 004, 005.

Both the dwelling room master device 2 (hereinafter referred to as a "fourth master device" 2c) having the terminal number 004 and the dwelling room master device 2 (hereinafter referred to as a "fifth master device" 2d) having the terminal number 005 of the dwelling unit 103 that has received the call signal emit call sounds and wait for response operations.

Upon receiving the call sound, for example, when the dweller operates the speech button 24a of the fourth master device 2c to perform the response operation, a response signal is transmitted to the first master device 2a as a calling source, and a speech path is formed between the fourth master device 2c and the first master device 2a.

Additionally, a reset signal to reset the calling is transmitted from the first master device 2a that has received the response signal to the fifth master device 2d, and then, the calling operation to the fifth master device 2d is stopped and the fifth master device 2d returns to the standby state.

It should be noted that the signal to stop calling the fifth master device 2d may be output from the fourth master device 2c, by which the response operation was made, to the fifth master device 2d.

Next, a description will be given of a case where the dwelling room master device 2 (hereinafter referred to as a "second master device" 2b) having the terminal number 002 in the standby state of the dwelling unit 101 calls the other dwelling unit in the state where the speech path has been formed as described above. Here, a case of calling the dwelling unit 103 in which the speech path has already been formed with the first master device 2a will be described.

Similarly to the above-described calling, through the predetermined calling operation by the second master device 2b, the call signal is transmitted to the fourth master device 2c and the fifth master device 2d. When receiving the call signal, the fourth master device 2c does not perform the calling operation because the fourth master device 2c has already been in the busy state. Meanwhile, since the fifth master device 2d is in the standby state, the fifth master device 2d emits the call sound in response to the call signal, sends back a call permission signal, and waits for the response operation.

The second master device 2b that has received a reply of the call permission signal continues the calling, and when the response operation of the fifth master device 2d receiving the calling is performed, a speech path is formed between the fifth master device 2d and the second master device 2b.

Consequently, the two speech paths are formed between the common two dwelling units.

Since a case where the second master device 2b calls the dwelling unit other than the dwelling unit 103 is similar to the calling operation of the first master device 2a as described above, the explanation is omitted.

Thus, even when the plurality of the dwelling room master devices 2 are installed in one dwelling unit and one dwelling room master device 2 is busy with the dwelling room master device 2 of the other dwelling unit, the speech path with the other dwelling unit can be formed using the other dwelling room master device 2. Accordingly, the plurality of dwelling room master devices 2 can be effectively used without the limitation of the number of the speech path formation. Additionally, since the dwelling room master devices 2 each perform the control of forming the speech path with the dwelling room master device 2 of the other dwelling unit, the need for installing a controller to control the communication between the devices like the conventional one can be eliminated.

It should be noted that, for example, in the case of a dwelling unit 102 in which only one dwelling room master device 2 is installed, during the speaking with the other dwelling unit, or when the speech path with the collective entrance machine 1 has been formed, the calling is not performed even when the calling from the other dwelling unit is made while notifying the calling source of the busy state.

FIG. 4 illustrates a table stored in the permitted dwelling unit storage section 23b. In FIG. 4, the dwelling unit number with "permitted" indicates the dwelling unit allowed for calling and speaking. For example, the table shows that the dwelling unit 101 is allowed for calling to the dwelling units 103, 105 and speaking with the dwellers of the dwelling units 103, 105. With this setting, while the dwelling unit 101 can call the dwelling unit 103 as described above, for example, the dwelling unit 101 cannot call a dwelling unit 104.

Thus, since the dwelling unit allowed for the calling and speaking can be set, the calling and speaking are restricted while the calling to any other dwelling unit and speaking with the dweller are capable with the setting. Accordingly, the calling from a suspicious dweller or an annoying dweller can be avoided. All the calling from the other dwelling units can be also inhibited. As a result, the function setting corresponding to the desire and safely using the function are allowed.

While the ID information storage sections 23a of the dwelling room master devices 2 each store the master device ID information of the dwelling room master devices 2 of all of the dwelling units in the above-described embodiment, only the ID information of the dwelling room master devices 2 of the dwelling units set to be allowed for the calling and speaking may be stored.

While the configuration in which the one or two dwelling room master devices 2 are installed in the dwelling unit is described, three or more dwelling room master devices 2 may be installed in one dwelling unit, and each of the dwelling room master devices 2 can call the other dwelling unit by the control similar to the above-described control.

The invention claimed is:

1. A multiple dwelling house interphone system comprising:
   a collective entrance machine installed at an entrance of a multiple dwelling house and used for calling and speaking with a dweller by a visitor; and
   dwelling room master devices installed in individual dwelling units and used for responding to the calling from the collective entrance machine, wherein
   a plurality of the dwelling room master devices are installed at least in one of the individual dwelling units, and the dwelling room master devices each include an ID information storage section, a calling operation section, and a master device speech control section, the ID information storage section stores a master device ID for identifying the dwelling room master device itself and master device IDs of the dwelling room master devices of other dwelling units, the calling operation section performs an operation of calling to the other dwelling unit, and the master device speech control section controls a calling and speaking to the dwelling room master device of the other dwelling unit, master device ID information stored in the ID information storage section is associated with a dwelling unit number, and when the calling operation section is operated and the dwelling unit number of a calling destination is input, the master device speech control section of the dwelling room master device of the dwelling unit having the plurality of dwelling room master devices performs a calling control of obtaining information on the master device ID associated with the dwelling unit number of the calling destination from the ID information storage section, transmitting a call signal to the dwelling room master device having the master device ID, and subsequently forming a speech path when a response operation of the dwelling room master device of the calling destination is performed, and the calling and speaking to the other dwelling unit are allowed even in a state where another dwelling room master device of the dwelling unit itself has formed a speech path with the dwelling room master device of the other dwelling unit.

2. The multiple dwelling house interphone system according to claim 1, wherein the dwelling room master device includes a permitted dwelling unit storage section that stores the dwelling unit to which the calling and speaking are permitted, and even when the calling operation section is operated to receive an input of the dwelling unit number of the calling destination, the master device speech control section does not transmit the call signal without the permission.

* * * * *